US008017235B2

(12) United States Patent
Nakamura et al.

(10) Patent No.: US 8,017,235 B2
(45) Date of Patent: Sep. 13, 2011

(54) METHOD FOR MANUFACTURING FINE COMPOSITE PARTICLES, APPARATUS FOR MANUFACTURING FINE COMPOSITE PARTICLES, AND FINE COMPOSITE PARTICLES

(75) Inventors: Hiroyuki Nakamura, Tosu (JP); Masato Uehara, Tosu (JP); Hongzhi Wang, Tosu (JP); Hideaki Maeda, Tosu (JP); Masaya Miyazaki, Tosu (JP); Yoshiko Yamaguchi, Tosu (JP); Kenichi Yamashita, Tosu (JP); Hazime Shimizu, Tosu (JP); Xyanying Li, Tosu (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 1382 days.

(21) Appl. No.: 10/570,384

(22) PCT Filed: Aug. 17, 2004

(86) PCT No.: PCT/JP2004/011782
§ 371 (c)(1),
(2), (4) Date: Sep. 8, 2006

(87) PCT Pub. No.: WO2005/023704
PCT Pub. Date: Mar. 17, 2005

(65) Prior Publication Data
US 2007/0128350 A1 Jun. 7, 2007

(30) Foreign Application Priority Data
Sep. 4, 2003 (JP) .................................. 2003-313208

(51) Int. Cl.
*B32B 5/66* (2006.01)
(52) U.S. Cl. ........................................ 428/403; 428/404
(58) Field of Classification Search .................. 428/403, 428/404
See application file for complete search history.

(56) References Cited

U.S. PATENT DOCUMENTS

| 2002/0083888 A1 | 7/2002 | Zehnder et al. |
| 2002/0144644 A1* | 10/2002 | Zehnder et al. ................. 117/84 |
| 2003/0059635 A1 | 3/2003 | Naasani |
| 2004/0009341 A1 | 1/2004 | Naasani |
| 2004/0025634 A1 | 2/2004 | Nakamura et al. |
| 2005/0220915 A1 | 10/2005 | Nakamura et al. |

FOREIGN PATENT DOCUMENTS
WO    WO 02/053810    7/2002

OTHER PUBLICATIONS

Hong Wang et al., "Preparation of ZnS-coated CdSe Nanoparticle in the Microreactor", The Society of Chemical Engineers, Japan, Shuki Taikai Kenkyu Happyo Koen Yoshishu, The Society of Chemical Engineers, Japan, Dai Kai, Aug. 12, 2003, p. 32.
A. R. Kortan et al., "Nucleation and Growth of CdSe on ZnS Quantum Crystallite Seeds, and Vice Versa, in Inverse Micelle Media", Journal of The American Chemical Society, American Chemical Society, Feb. 14,1990, vol. 112, No. 4, pp. 1327-1332.
M. Azad Malik et al., "A Simple Route to the Synthesis of Core/Shell Nanoparticles of Chalcogenides", *Chem. Mater.*, vol. 14, No. 5, pp. 2004-2010, 2002.
Xiaogang Peng et al., "Epitaxial Growth of Highly Luminescent CdSe/CdS Core/Shell Nanocrystals with Photostability and Electronic Accessibility", *J. Am. Chem Soc.*, vol. 119, No. 30, pp. 7019-7020, 1997.
M. Azad Malik et al., "Air Stable Single-Source Precursors for the Synthesis of Chalcogenide Semiconductor Nanoparticles", *Chem. Mater.*, vol. 13, No. 3, pp. 913-920, 2001.
Joël Bleuse et al., "Optical Properties of Core/Multishell CdSe/Zn(S, Se) Nanocrystals", *Physica E*, pp. 331-335, 2004.
Holger Borchert et al., "Photoemission Study of Onion Like Quantum Dot Quantum Well and Double Quantum Well Nanocrystals of CdS and HgS", *J. Phys. Chem. B.*, vol. 107, No. 30, pp. 7486-7491, 2003.
Seung Uk Son et al., "Designed Synthesis of Atom-Economical Pd/Ni Bimetallic Nanoparticle-Based Catalysts for Sonogashira Coupling Reactions", *J. Am. Chem. Soc.*, vol. 126, No. 16, pp. 5026-5027, 2004.
Wei Wang et al., "Silver Nanoparticles Capped by Long-Chain Unsaturated Carboxylates", *J. Phys. Chem. B.*, vol. 103, No. 34, pp. 7238-7246, 1999.
Srihari Murthy et al., "Liquid-phase Synthesis of Thiol-derivatized Silver Nanocrystals", *Materials Letters 30*, pp. 321-325, 1997.
Xue Zhang Lin, "Direct Synthesis of Narrowly Dispersed Silver Nanoparticles Using a Single-Source Precursor", *Langmuir*, vol. 19, No. 24, pp. 10081-10085, 2003.
Benjamin Wiley et al., "Polyol Synthesis of Silver Nanoparticles: Use of Chloride and Oxygen to Promote the Formation of Single-Crystal, Truncated Cubes and Tetrahedrons", *Nano Lett.*, vol. 4, No. 9, pp. 1733-1739, 2004.
Yugang Sun et al., "Shape-Controlled Synthesis of Gold and Silver Nanoparticles", *Science*, vol. 298, pp. 2176-2179, 2002.

* cited by examiner

*Primary Examiner* — Leszek Kiliman
(74) *Attorney, Agent, or Firm* — Harness, Dickey & Pierce, P.L.C.

(57) ABSTRACT

In the present invention, the fine particle composite process is carried out with the step of reacting fine core particles and a raw material for coating layer by mixing them and continuously supplying a resulting mixture into a micro flow path. The micro flow path is specified to 1-4000 in Reynolds number. With this arrangement, the present invention ensures, in a technology using a reactor having a micro flow path, accurate control of reaction condition, uniformity of coating amount distribution, easy layer formation, and successive production of fine composite particles.

4 Claims, 7 Drawing Sheets

METHOD FOR MANUFACTURING FINE COMPOSITE PARTICLES, APPARATUS FOR MANUFACTURING FINE COMPOSITE PARTICLES, AND FINE COMPOSITE PARTICLES

TECHNICAL FIELD

The present invention relates to a method for manufacturing fine composite particle, manufacturing apparatus for fine composite particle, and fine composite particle, particularly to a manufacturing method using a micro flow path, and new fine composite particles effectively manufactured through this manufacturing method.

BACKGROUND ART

Nanometer fine particles (nano particles) have come to the front recently as a material for producing stable monotone fluorescent particles, a material of magnetic particles, or as a componential member of tunable light emitting diode, a single-particle transistor, a building block for superdense magnetic storage medium etc.

The demand of the nano particles is particularly increasing recently because of the enlargement of its usage along with the advance in technology. The typical materials of the nano particles are some metals such as gold, platinum, or nickel; some compounds, such as platinum iron, titanium oxide, zinc oxide, cadmium selenide, or zinc sulphide. Such nano particles of various materials are manufactured through various synthetic methods (manufacturing methods), such as a homogeneous precipitation method, hydrothermal crystallization method, organometallic route process, etc.

Meanwhile, the inventors of the present invention invented a method of accurately controlling the deposition condition (reaction condition), by which the fine particles of desired diameter are continuously manufactured (Kokai (Jpn. unexamined patent publication) No. 2003-225900). This method uses a reactor having a micro flow path, allowing control of reaction conditions, such as temperature, concentration, duration etc.

There also have been many developments of technology for producing composites fine particles by mixing some of the fine particles (M. Azad Malik et al., Chem. Mater. 2002, 14, 2004-2010). Combination of different kinds of particles allows not only improvement of the existing characteristics of the fine particles, but also provision of new functions.

For example, coating the fine particle of CdSe or InP with ZnS, which is larger in bandgap than the materials, creates ZnS coated particle. This ZnS coated fine particle has an effect of preventing the holes or electrons to be brought onto the defective surface of fine particle, thereby significantly improving fluorescence efficiency. Similarly, coating gold (Au) fine particle with silica creates silica coated gold particle. The composite particles are very easily dispersed in glass through sol-gel process or the like. With this advantage the particles are useful for preparation of nonlinear optical material.

In production of fine composite particles of nanometer order, particularly of the coated fine composite particles explained above, control of reaction condition is necessary to create a particle having a desired diameter. Typically, it is necessary to use appropriate kind of organic molecules of the material and/or the co-existing surfactant, or to control speed of decomposition of precursor of particle by changing the temperature/duration in the reaction process.

However, the method of controlling diameter of particle by changing the temperature/duration in the reaction process, the control is not easy, and also the quality of resulting particles may be not always good.

More specifically, the conventional particle-manufacturing apparatuses are not capable of accurate control of the temperature/duration in the reaction process in the manufacturing of coated composite particles. In other words, the accurate control in the reaction conditions is indispensable to accurate control of coating amount, but it cannot be achieved by the conventional manufacturing apparatuses.

Because of this, the reaction process in the manufacturing of fine composite particles is set longer than necessary on purpose in order to ensure more accurate control of reaction condition.

However, this sometimes requires a change in condition of the reaction system, and an excessively long reaction process causes an increase in particle size distribution due to Oswald maturation or the like. In the case of ZnS coated CdSe fine particles, the increase in particle size distribution means an increase in distribution of degree of quantum effect which depends on the particle diameter. This may therefore result in distribution in fluorescent spectrum (M. Azad Malik et al., Chem. Mater. 2002, 14, 2004-2010 etc.)

In view of this problem, a new technology has been demanded by which reaction condition, especially duration in reaction temperature, concentration of fine core particle and raw material for coating layer, and a time for keeping the fine core particles and the raw material for coating layer inside the micro flow path can be accurately controlled, allowing continuous production of fine composite particles with desired coating amount. Further, to produce a composite fluorescent nano particle having a semiconductor nano particle as its nucleus, there has been a demand of a technique by which coating time is reduced, and the coating amount becomes even. If this technique is complete, the increase in distribution in fluorescence spectrum will be easily avoided.

Further, the change in characteristic, such as a change in absorption band of the silica coated gold particles due to plasmon response in the surface of a cluster, depending on the thickness of coating, is often seen also in the composite fluorescent nano particle having a semiconductor nano particle as its nucleus. This necessity of control the characteristic of fine composite particles is another reason why the even coating is required.

The present invention is made in view of the foregoing problems, and an object is to provide a manufacturing method and manufacturing apparatus for continuous manufacturing of fine composite particles, by which reaction condition is accurately controlled and coating distribution becomes even. The present invention also provides one kind of fine composite particles obtained by the manufacturing method.

DISCLOSURE OF INVENTION

As a result of intensive studies of fine particle manufacturing methods, the inventors of the present invention has found that a method using a micro flow path allows accurate control in temperature/concentration/retention time, and therefore enables continuous production of fine composite particles, while adjusting amount of coating. With this finding, the inventors completed the present invention.

The present invention provides a method of manufacturing fine composite particles constituted of a plurality of components, which comprises the step of: (a) reacting fine core particles of 1-1000 nm in particle diameter and a raw material for coating layer by mixing them and continuously supplying a resulting mixture into a micro flow path of 1 μm-5000 μm in diameter while controlling reaction condition, so as to produce fine composite particles, wherein: the fine core particles are constituted of n−1 (n being an integer not less than 2) kinds of component, and the raw material for coating layer is constituted of at least the n-th component, and the micro flow path is specified to 1-4000 in Reynolds number.

In this method, it is preferable that the micro flow path is specified to 50-1000 μm in diameter. Further, in the step (a), it is preferable that either or both of the fine core particles and the raw material for coating layer is (are) dissolved or dispersed in a solvent or a dispersion liquid to be a solution or a dispersion liquid.

This method further comprises the step of: (b) synthesizing nuclei for fine particles from a first component. The nuclei for fine particles are preferably specified to 1-1000 nm in particle diameter. The more preferred nuclei for fine particles are specified to 1-30 nm in particle diameter. In the step (b), the nuclei for fine particles are preferably synthesized by continuously supplying a solution containing a particle-forming precursor having the first component into a nuclei for fine particle-forming micro flow path while controlling reaction condition, and in the step (a), the nuclei for fine particles are preferably continuously supplied into the micro flow path as the fine core particles.

In this method, reaction condition is controlled by adjusting at least one of (i) reaction temperature and duration of the temperature, (ii) concentrations of the fine core particles and the raw material for coating layer, and (iii) a time for keeping the fine core particles and the raw material for coating layer inside the micro flow path.

In this method, the fine core particles and the raw material for coating layer may be mixed under a temperature lower than a reaction temperature, and the fine core particles and the raw material for coating layer may be reacted by being heated up to the reaction temperature within a time range of 0.001 seconds to 1 hour, more preferably 0.01 seconds to 1 minute. In the step (a), the fine core particles and the raw material for coating layer may be mixed under a temperature equal to a reaction temperature after a solution of the raw material for coating layer is heated, within a time range of 0.00001 seconds to 1 minute.

In this method, it is preferable that equal to or more than n+1 kinds of component is used as the raw material for coating layer, and the step (a) is carried out plural times so as to continuously supply the n+1 or more kinds of component. Further, in the step (a), two or more kinds of component may be simultaneously supplied as the raw material for coating layer. Otherwise, the step (a) is carried out respectively and simultaneously in a plurality of micro flow paths aligned in parallel.

With such arrangements, this method manufactures coating-type fine composite particles. The fine core particles and a coating layer may be both made of II-VI compound semiconductor, such as CdSe, CdTe, CdS, PbS, PbTe, PbSe, ZnS, ZnSe, ZnTE, MgS, MgSe, and MgTe; and III-V type compound semiconductors, such as InP, InAs, InN, AlN, AlP, AlAs, GaP, GaAs, and GaN. The fine core particles and a coating layer may be otherwise $CuGaS_2$ or $CuInS_2$ compound semiconductors, Si or Ge compound semiconductors. In the resulting fine composite particles, an increase in half bandwidth of fluorescence is at or lower than 15%, and has a greater fluorescence strength.

In this method, it is preferable that heating time in reaction process is within 30 minutes, more preferably within 15 minutes, further preferably within 2 minutes. Further, alkyldiselenocarbamate and alkyldithiocarbamate are preferably used as the raw material for coating layer.

The present invention provides a manufacturing apparatus for fine composite particles constituted of a plurality of components, which comprises: a reactor including a micro flow path of 1 μm-5000 μm in diameter and 1-4000 in Reynolds number, fine core particles supplying means for continuously supplying a fine particles dispersion solution obtained by dispersing fine core particles of 1-1000 nm in particle diameter into the micro flow path; and raw material for coating layer supplying means for continuously supplying a raw material for coating layer into the micro flow path so as to react the raw material for coating layer with the fine core particles to be fine composite particles, wherein: the fine core particles are constituted of n−1 (n being an integer not less than 2) kinds of component, and the raw material for coating layer is constituted of at least the n-th component, and the fine core particles and the raw material for coating layer continuously supplied into the micro flow path are reacted while controlling reaction condition so as to continuously produce the fine composite particles.

In this method, it is preferable that the micro flow path is specified to 50-1000 μm in diameter. The micro flow path may be constituted of a capillary tube. The capillary tube may be specified to 10 μm-3 mm in wall-thickness.

In this apparatus, it is preferable that the fine core particles supplying means synthesize nuclei for fine particles constituted of a first component, and supply the nuclei for fine particles into the micro flow path. The apparatus preferably further comprises (i) a reactor including a base-material-synthesizing micro flow path; and (ii) particle-forming precursor supplying means for continuously supplying a solution containing a particle-forming precursor having the first component into a nuclei for fine particle-forming micro flow path. In this case, the particle-forming precursor is reacted under a specific condition so as to produce nuclei for fine particles of 1-1000 nm in particle diameter.

Further, the apparatus preferably further comprises: control means for controlling operation of the raw material for coating layer supplying means. Further, the apparatus preferably comprises a plurality of the raw material for coating layer supplying means. When the apparatus is arranged so that each of which supplies a different kind of component, the control means preferably individually controls the operations of the plurality of raw material for coating layer supplying means so as to cause them to continuously supply components.

Fine composite particles manufactured through the method of the present invention, or through the apparatus of the present invention is characterized in that the nuclei for fine particles are each coated with one or more coating layer. The maximum particle diameter of the composite particles is 1000 nm or smaller, and each of the particles is coated with a plurality of layers of different kinds of semiconductor material, including a sandwich structure in which a layer of semiconductor material having a small bandgap is sandwiched between two layers of semiconductor material having a large bandgap.

In the fine composite particle, the semiconductor material having a small bandgap and the semiconductor material having a large bandgap are made of different kinds of II-VI compound semiconductor. More specifically, the semiconductor material having a large bandgap is ZnS, and the semiconductor material having a small bandgap is CdSe.

In the fine composite particle, it is preferable that the maximum particle diameter of the fine composite particles be 20 nm or smaller. It is further preferable that the maximum particle diameter of the fine composite particles be 10 nm or smaller. It is preferable that the thickness of the layer of the small bandgap semiconductor material be 2 nm or smaller.

The method of manufacturing the foregoing fine composite particle uses a micro flow path of 1 μm-5000 μm in diameter, and 1-4000 in Reynolds number The method comprises the steps of: (a) mixing nuclei for fine particles made of the semiconductor material having a large bandgap with a raw material for coating layer made of the semiconductor material having a small bandgap, and continuously supplying a resulting mixture into the micro flow path while controlling reaction condition, so as to coat each of the nuclei for fine particles with a layer made of the semiconductor material having a small bandgap; and (b) mixing the nuclei for fine particles coated with the layer of the semiconductor material having a small bandgap with a material of the layer of the semiconductor material having a large bandgap, and continuously supplying a resulting mixture into the micro flow path while controlling reaction condition so as to coat each of the nuclei for fine particles coated with the layer of the semiconductor material having a small bandgap with a layer of the semiconductor material having a large bandgap.

In this method, it is preferable that, in the step (a), the reaction condition be controlled so that the layer of the semiconductor material having a small bandgap is changed in thickness.

In the method and apparatus of the present invention for manufacturing fine composite particles, the micro flow path used for the fine particle composite process is set to 1-4000 in Reynolds number. With this structure, the present invention provides an advantage that the reaction condition in the composite reaction process can be accurately controlled without setting a longer reaction time, allowing mass production of coating-type nano fine composite particles, in each of which a nuclei for fine particle is coated with a layer. Further, the present invention particularly allows controls of reaction temperature and retention time, thereby ensuring continuous control of particle diameter in manufacturing fine composite particles.

Further, the fine composite particle of the present invention includes a sandwich structure in which a layer of semiconductor material having a small bandgap is sandwiched between two layers of semiconductor material having a large bandgap. On this account, the layer made of the semiconductor material having a small bandgap can be made thinner, by which the crystallization property improves. The conventional art has never accomplished a fine composite particle emitting a blue fluorescent with a high quantum yield, but the present invention thus achieved it.

Additional objects, features, and strengths of the present invention will be made clear by the description below. Further, the advantages of the present invention will be evident from the following explanation in reference to the drawings.

BEST MODE FOR CARRYING OUT THE INVENTION

Figure 1:
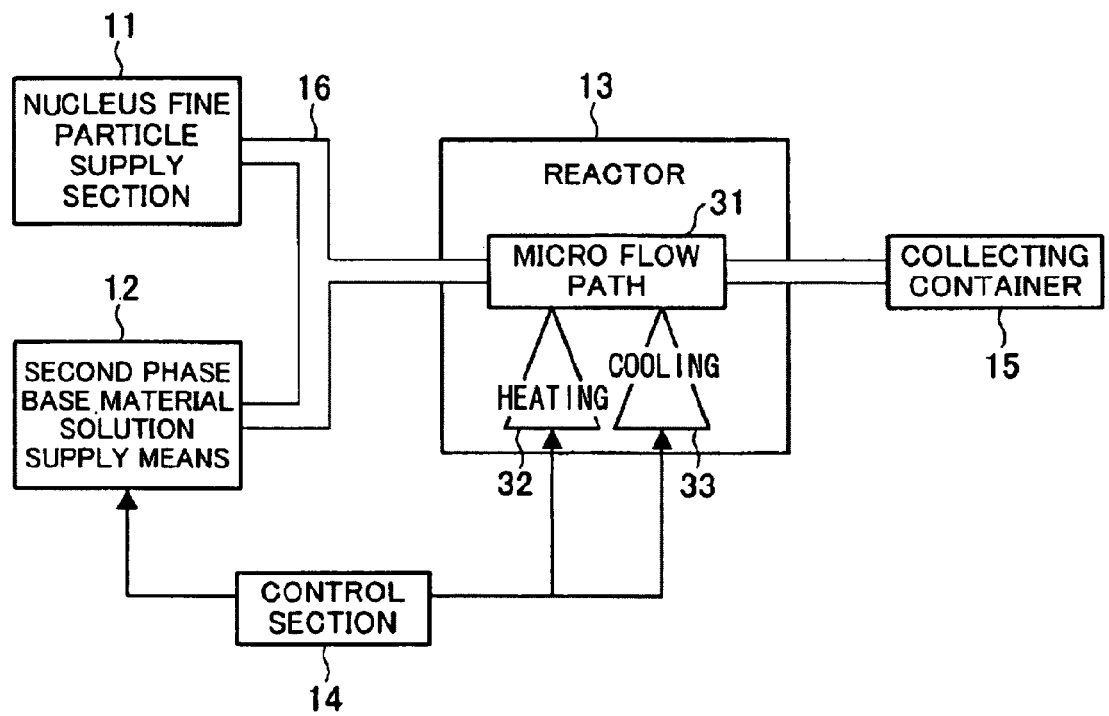
FIG. 1 is a block diagram showing an example of manufacturing apparatus for fine composite particle according to the present invention.

The following explains one embodiment of the present invention with reference to Figures. It however should be noted that the present invention is not limited to the embodiment below. In the following embodiment, fine composite particles manufactured by the manufacturing method of the present invention, one specific example of the particles (new fine composite particles), a method for manufacturing fine composite particles of the present invention, and a manufacturing apparatus are explained in detail, followed by some concrete Examples.

(1) Fine Composite Particle Manufactured by the Present Invention

The fine composite particle according to the present invention is fine particle of nano meter order diameter (nano particle), and is made of plural components. Within this range, the fine composite particle of the present invention may be any particle. A typical example may be a coated fine composite particle, which here designates a particle in which the surface of the nucleus particle is coated with one or more layers.

In the case of the fine composite particle, it may be coated with two or more coating layers, and the order of layering or the thicknesses of the respective layers are not particularly limited. The order and the thickness are determined according to the usage or the desired function of the fine composite particle.

The material of the nuclei for fine particle of the fine composite particle and the components of the coating layers are not limited either. However typical examples are some oxides, such as titania (anatase-type etc.) or zinc oxide; some chalcogenide compounds, such as cadmium selenide, or zinc sulphide; some metals, such as gold, silver, platinum, palladium, cobalt or nickel; some semimetals (semiconductor), such as silicon or germanium; some polymer compounds, such as polystyrene. In the Embodiment below, cadmium selenide, platinum, gold, and polystyrene are used as the material of nuclei for fine particle, and zinc sulphide, maghemite, silver, and titania are used as the material of coating layers.

As explained later, the fine composite particle of the present invention is manufactured by reacting a material in a reactor. Therefore, the material is not always required to be low material but may be a substance tuned into the desired material as a result of reaction. In the present invention, the material supplied to the reactor may be a raw material for coating layer for forming a coating layer, or a particle-forming precursor for synthesizing the nuclei for fine particles.

More specifically, typical example of the raw material for coating layer may be a monomolecular compound containing selenium or sulfur such as alkyldiselenocarbamate, alkyldithiocarbamate or xanthic acid. The compound mainly includes $[(CH_3)_2NCSS]_2Zn$, $[(C_2H_5)_2NCSS]_2Zn$, $C_2H_5ZnS_2CN(C_2H_5)_2$, $Cd[S_2CNCH_3(C_6H_5)]_2$ for ZnS coating, and $Zn[Se_2CNCH_3(C_6H_5)]_2$ for ZnSe coating, and the molecules are decomposable by heat to be coating layers.

In the present invention, the way of carrying out reaction in the micro flow path is not particularly limited as long as it uses a solution or a dispersion solution of the base material and the raw material for coating layer, and it causes the surface of base material to be coated with a layer through mixture or heating of the raw material for coating layer. A particularly preferable is a method ensuring high-speed reaction, or a method in which the speed for layer-deposition greatly depends on the reaction temperature and/or the concentration of raw material for coating layer.

The method ensuring high-speed reaction may be a organometallic route process, a homogeneous precipitation method, an alcoxide hydrolytic cleavage etc. On the other hand, the method in which the speed for layer-deposition greatly depends on the reaction temperature and/or the concentration of raw material for coating layer may be a method of depositing a metal layer by reacting a soluble metal compound solution by a reducer, a method of depositing a calcium carbonate layer by reacting a calcium hydroxide aqueous solution with a carbonic acid, a method of depositing a calcium sulfide layer by reacting a calcium chloride aqueous solution with a sulfur aqueous solution, a method of depositing a cadmium sulfide layer by reacting cadmium chloride aqueous solution with hydrogen sulfide aqueous solution, a method of depositing a silicon oxide layer by decomposing a tetra silicon alcoxide by heat, a method of depositing a cadmium selenide layer by reacting a water-soluble cadmium compound aqueous solution by water-soluble selenide compound aqueous solution. However, the present invention is not limited to these methods.

Here, the fine composite particle according to the present invention may be used as a fluorescent material by forming both the nuclei for fine particle and the coating layer from a semiconductor material. In this case, the fine composite particle has a structure in which an increase in half bandwidth of fluorescence is at or lower than 15%, and a fluorescence strength is increased in fluorescence spectrum measurement.

In this fine composite particle, a II-VI type semiconductor is preferably used as the fine core particle, and a III-V type compound semiconductor is preferably used as a coating layer. The II-VI type compound semiconductor may be CdSe, CdTe, CdS, PbS, PbTe, PbSe, ZnS, ZnSe, ZnTe, MgS, MgSe, or MgTe. Further, the III-V compound semiconductor may be a compound semiconductor such as InP, InAs, InN, AlN, AlP, AlAs, GaP, GaAs, GaN, AlGaInP, AlGaAs, InGaAsP, ZnMgCdSe; a different compound semiconductor such as $CuGaS_2$ or $CuInS_2$; or a semiconductor such as Si or Ge, which may be doped with a different substance.

In the present invention, the reaction condition is controlled as described below, and therefore it is not necessary to extend the reaction time. On this account, the increase in particle size distribution due to Oswald maturation is prevented. As a result, in the case of ZnS coated CdSe fine particle for example, the increase in distribution of degree of quantum effect, which depends on the particle diameter, is suppressed. Consequently, the increase in fluorescent spectrum is suppressed, and fluorescent strength is improved.

The particle size diameter of the fine composite particle according to the present invention is not limited, and may be set to an appropriate value according to the material and synthesis condition. However, in the present invention, when the particle diameter (the maximum diameter) exceeds 1 μm, the fine composite particles settle down in the micro flow path, and are likely to block the micro flow path. Therefore, it is necessary to set the particle diameter to a nanometer, equal to or less than 1 μm. Note that, the maximum diameter here indicates an average length of the longest circumferences of the fine composite particles.

It may be obvious but the fine composite particle is not limited only to the coated particle. The type of fine composite particle can be determined by selecting desired reaction process, material, supply method etc. Therefore, the raw material for coating layer is not limited only to those for coating purpose as long as it can be combined with the fine core particle, such as the nuclei for fine particle, through a reaction process.

(2) Concrete Example of Fine Composite Particle of the Present Invention

As described in the Examples below, typical examples of fine composite particle according to the present invention includes a ZnS coated CdSe fine particle (Examples 1-3), a maghemite coated platinum fine particle (Example 4), a silver coated gold fine particle (Example 5), a $TiO_2$ coated polystyrene (Example 6), a CdSe coated ZnS fine particle (Example 7), and a ZnS/CdSe/ZnS-type fine particle (Examples 8-10).

Among these, the ZnS/CdSe/ZnS fine particle is a new and effective nano particle in which CdSe, serving as a light source, emits blue light.

The conventional methods have carried out synthesis of CdSe nano particle (CdSe nano particle), but the crystallization property of CdSe nano particle decreases when the diameter falls below 2 nm. Therefore, the conventional method have not been able to produce a CdSe nano particle emitting blue fluorescence light (fluorescence light wavelength <480 nm) with a high quantum yield. Further, because of the significantly short manufacturing time of the CdSe nano particle, there has been a difficulty in accurately setting the particle diameter to a desired value.

In view of this problem, the inventors of the present invention have attempted an intensive study, and came to an idea of adopting a sandwiched structure in which a layer of semiconductor material having a small bandgap is sandwiched between two layers of semiconductor material having a large bandgap (ZnS/CdSe/ZnS). With this structure, the inventors of the present invention have created a fine composite particle including, as an intermediate layer, CdSe which emits light (Examples 8-10).

Specifically, one of the fine composite particles of the present invention is a nano particle coated with a plurality of layers of different kinds of semiconductor material, and includes a sandwich structure in which a layer of semiconductor material having a small bandgap (for ease of explanation, this layer will hereinafter be referred to as a small gap material layer) is sandwiched between two layers of semiconductor material having a large bandgap (for ease of explanation, this layer will hereinafter be referred to as a large gap material layer).

With the conventional manufacturing method, the control of particle diameter was difficult, and the manufacturing of the fine composite particle was not easy. In contrast, the present invention precisely controls the reaction condition, and therefore the coating amount distribution becomes even. This advantage eases formation of the sandwich structure and allows easy control of the respective thicknesses of plural layers. On this account, the present invention produces a new composite particle described in Example 8, and makes it possible to control the functions of the composite particle, such as fluorescence by the control of reaction condition described in Examples 9 and 10.

The sandwich structure of the fine composite particle is not particularly limited, but the semiconductor material having a small bandgap and the semiconductor material having a large bandgap may be made of different kinds of II-VI compound semiconductor. More specifically, ZnS is preferably used as the semiconductor material having a large bandgap, and CdSe is preferably used as the semiconductor material having a small bandgap, but the present invention is not limited to those.

Figure 5:
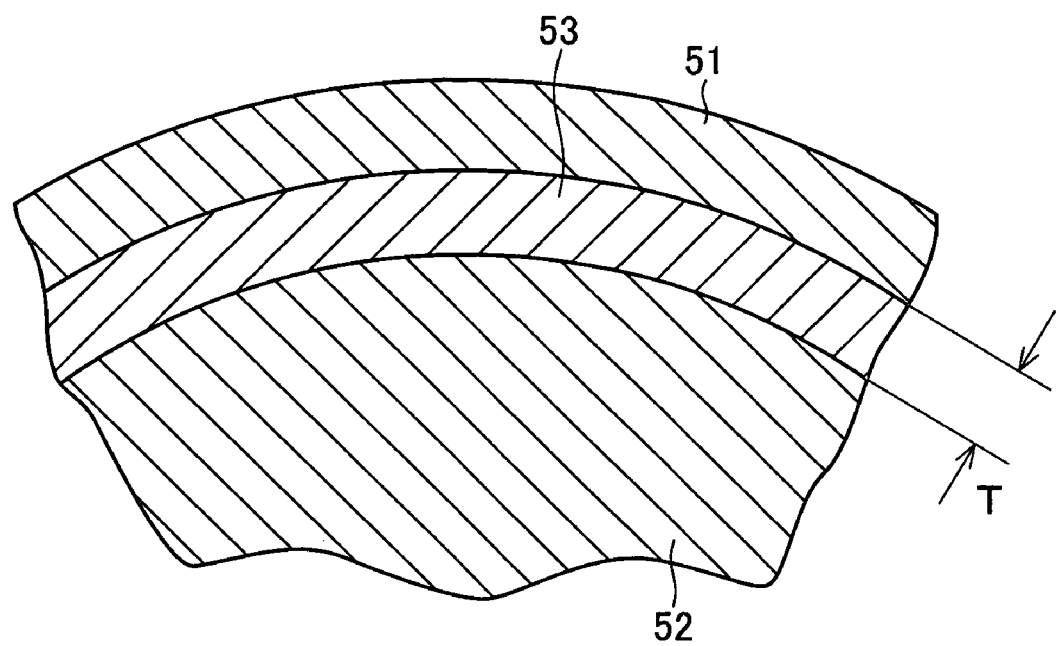
FIG. 5 is a partial cross-sectional view showing a schematic structure of new fine composite particle provided by the present invention.

In the sandwich structure, a small gap material layer 53 is caught between a large gap material layer 51 and another large gap material layer 52 as shown in FIG. 5, but otherwise the arrangement of the sandwich structure is not particularly limited. In Examples 8 through 10, a particle made of semiconductor material having a large bandgap (ZnS fine particle) is used as the nuclei for fine particle, and a small gap material layer (CdSe layer) and another large gap material layer (ZnS layer) are sequentially overlaid thereon. However, the present invention is not limited to this structure in which the nuclei for fine particle is coated with two layers. For example, a large gap material layer, a small gap material layer and another large gap material layer may be sequentially layered on a nuclei for fine particle of different material, which forms a three-layer structure. Further, it may contain more layers.

The maximum particle diameter among the fine composite particles of the sandwich structure is nanometer order, not more than 1 μm, that is not more than 1000 nm. The maximum particle diameter is not limited within this range; however, the maximum particle diameter is preferably not more than 20 nm, more preferably not more than 10 nm.

By setting the maximum particle diameter to 20 nm or smaller, it becomes possible to set the thickness of the small gap material layer (e.g. CdSe layer) to 2 nm or smaller, more preferably approximately 1 nm. On this account, the crystallization property of the small bandgap semiconductor material improves, and a blue fluorescence with a high quantum yield (fluorescence wavelength <480 nm) can be more easily obtained.

The fine composite particle having the sandwich structure is more easily manufactured through the later-described manufacturing method and manufacturing apparatus. To be more specific, the foregoing manufacturing method produces a fine composite particle in which a small gap material layer is caught between two large gap material layers, but it is more preferable to sequentially form a small gap material layer and a large gap material layer on the large gap semiconductor layer, as shown in Examples 8 through 10.

That is, in the process of forming a small gap material layer, the nuclei for fine particles of the layer of the semiconductor material having a large bandgap is mixed with a raw material for coating layer for forming a layer of the semiconductor material having a small bandgap, and a resulting mixture is continuously supplied into the micro flow path under a specific condition. In the process of forming a large gap material layer, the nuclei for fine particles coated with the layer of the semiconductor material having a small bandgap is mixed with a raw material for coating layer for forming a layer of the semiconductor material having a large bandgap, and a resulting mixture is continuously supplied into the micro flow path under a specific condition.

In this process of forming a small gap material layer, it is possible to control the fluorescent light wavelength of the resulting fine composite particle by controlling the reaction condition to change the thickness (T in FIG. 5) of the layer. This control of reaction condition will be described later.

(3) Method for Manufacturing Fine Composite Particle

The manufacturing method of the present invention is a method of manufacturing the above-described fine composite particle, and includes a step of combining plural kinds of fine particles, and preferably includes a fine core particle synthesizing step.

[Fine Particle Composite Process]

In the fine particle composite process, the fine core particle is mixed with the fine composite particle, and then react them each other. The way or condition of this step is not particularly limited; however, as described later, the reaction process in this step is carried out using a micro flow path whose Reynolds number is set to 1-4000.

Each fine core particle has the particle diameter of 1-1000 nm, and its surface is coated with a layer. One specific example of the nuclei for fine particle is the one explained in the section (1) above, or the fine composite particle.

In other words, in the fine particle composite process for manufacturing fine composite particle containing n components (n being an integer not less than 2), the fine core particle is are constituted of n−1 kinds of component, and the raw material for coating layer is constituted of at least the n-th component. In the case where n=2, the fine core particle is made of a single kind of component, which is the nuclei for fine particle. In the case where n>3, the fine core particle is made of two kinds of component, which is the fine composite particle.

Therefore, in the fine particle composite process, the fine composite particles may be manufactured by coating the nuclei for fine particle with a layer, or by coating the fine core particle, in which the nuclei for fine particle is coated with a layer, with another layer.

It is preferable that one of the fine core particles and the raw material for coating layer be dissolved or dispersed in a solvent to be dispersion liquid. With this arrangement, the respective materials are sequentially supplied to the micro flow path, and the nucleus can be efficiently and easily mixed. This solvent is not particularly limited, and one of the conventional solvents suitable for composite reaction is used. More specifically, the typical examples includes water or aqueous solution; some non-polar organic solvents, such as hexan, cyclohexane, or truen; some polar organic solvents such as dimethylsulfoxide, or dimethylformamide. However, the solvent is not limited to those. The solvent may be used individually, or as a mixture of plural kinds of them.

In the present invention, the fine particle composite step may be carried out only once or plural times. More specifically, the fine particle composite step may be carried out as follows. The fine core particles made of n−1 kinds of components are mixed with a raw material for coating layer, which is fine composite particles made of the nth component. Then, the resulting fine composite particles are used as the fine core particles to be mixed with the nth+1 or more kinds of component. The nth+1 or more kinds of component are separately and successively supplied by repeating the fine particle composite step plural times. In this manner, the fine composite particles each of which has a multilayer (at least 3 layers) structure are continuously manufactured.

Further, in the fine particle composite step of the present invention, the raw material for coating layer may be two or more kinds of, component, which are simultaneously supplied. In this case, because the coating layer is formed from plural components simultaneously supplied, more preferable characteristic can be given to the resulting particles, depending on the type of the fine composite particle.

The mixing of the fine core particles and the raw material for coating layer is completed at the former stage of combining. Otherwise, the way/condition of the method is not particularly limited. Therefore, the fine core particle dispersion solution and liquid in which the raw material for coating layer is dissolved may be used. Or, as with the manufacturing apparatus described later, the means for supplying the fine core particle and the means for supplying the raw material for coating layer may be connected so as to continuously mix them.

[Micro Flow Path]

The micro flow path used for the fine particle composite step is a main component of the reactor, and may denote the reactor itself. The micro flow path has a function of keeping the liquid in the form of laminar flow. Otherwise, the type of micro flow path is not particularly limited. However, the diameter of the flow path is preferably set to 1-5000 $\mu$m, more preferably set to 50-1000 $\mu$m.

As the diameter of micro flow path decreases, the capacity of micro flow path with respect to the superficial area decreases, and the characteristic length of the channel also decreases. Therefore, the reaction condition in the synthesis of the fine composite particle can be precisely controlled. For example, the control of reaction temperature by a small heat capacity, and the control of concentration of material by a short diffusion distance become very accurate.

By thus setting the diameter of micro flow path within the range of 1-5000 $\mu$m, the control of the reaction condition becomes very accurate, and therefore the reaction process in the synthesis of the fine composite particles is reduced. On this account, the productivity in the manufacturing of fine composite particles with a micro flow path increases.

It however should be noted that a micro flow path of 1 $\mu$m or less in diameter causes greater pressure loss in the synthesis process. Therefore, the productivity of the fine composite particle decreases, making the various control in the synthesis process difficult. Meanwhile, when the reaction for making composite particles is carried out by a heating process, the superficial area of the micro flow path with respect to the capacity (volume) of the micro flow path is reduced. Therefore, the accurate control of reaction temperature becomes difficult. For this reason, the diameter of micro flow path is preferably set within a range 1-5000 $\mu$m.

Further, Reynolds number of the micro flow path is set within a range of 1-4000. If the Reynolds number of the micro flow path is less than 1, the productivity will be not sufficient to satisfy the required practical productivity. Therefore, the lower limit of Reynolds number is preferably set to 1 or greater. On the other hand, if the Reynolds number is more than 4000, the back mixing due to crosscurrent is more likely to occur, causing variation in reaction time, and the addition amount distribution of the n-th raw material for coating layer tends to vary. Therefore, the upper limit of Reynolds number is preferably set to 4000 or lower, more preferably 2100 or lower.

Apart from the specific diameter and Reynolds number, the structure of micro flow path is not particularly limited. For example, the length of micro flow path is preferably set within a range of 1 cm to 100 m, more preferably within a range of 4 cm to 30 m, the control in reaction condition becomes easier, but the present invention is not limited only to these values.

The micro flow path may be made of a micro capillary. In this case, a thinner wall is more preferable for the micro capillary tube, i.e., the thickness of the wall of capillary tube is preferably small. More specifically, the thickness is set in a range of 10 $\mu$m to 3 mm with which the temperature control becomes easier; however the thickness is not limited to this range.

Further, the structure and material of the member serving as a micro flow path are not particularly limited, either. For example, in the case of using a capillary tube, a suitable material may be a glass; a metal (alloy); a resin such as polyolefin, polyvinyl chloride, polyamide, polyester, or fluoroplastic. However, the material of capillary tube is not limited to them.

As an alternative structure, a heat-resistant layer is formed on a heat-resistant substrate, and a groove is formed on the heat-resistant layer as a micro flow path. The heat-resistant substrate is made of a metal (alloy) or the like, and the heat-resistant layer is made of, for example, a metal oxide such as silica, alumina, or titania; or a heat-resistant resin such as fluoroplastic, or polyimide.

[Control of Reaction Condition]

The method for manufacturing fine composite particle according to the present invention allows precise control of reaction condition in the fine particle composite process. Specifically, the reaction condition is at least one of: (i) reaction temperature and duration of the temperature, (ii) concentrations of the fine core particles and the raw material for coating layer (they together will be called "the material"), (iii) a time for keeping the fine core particles and the raw material for coating layer inside the micro flow path. The following more specifically explains the control of reaction condition.

Firstly, the following explains (i) reaction temperature and duration. The reaction temperature may be set to an appropriate value according to the type of material and the type of reaction. The duration of reaction temperature is determined depending on the temperature at which the raw material for coating layer is mixed with the base material. For this temperature, there are two different cases as follows. In the first case, the composite base material and the base material are mixed at a temperature lower than the reaction temperature. In this case, in the stage of reacting the fine core particle and the raw material for coating layer, the mixture is heated to the reaction temperature within a time range of 0.001 seconds to 1 hour. Also, the temperature can be adjusted during the heating. In the second case, the materials are mixed at a temperature equal to the reaction temperature. In this case, the solution of raw material for coating layer is heated first and then added within a time range of 0.00001 seconds to 1 minute. Note that, as described later, another reaction condition: (ii) concentration of base material also needs to be taken into account in the second.

In any of the foregoing cases, the range of duration of reaction temperature is large, and therefore the thickness of the layer can be desirably controlled in the resulting fine composite particle.

Here, to avoid increase in particle size distribution of fine composite particle due to Oswald maturation, and to improve productivity, the duration of reaction is preferably short. In view of this the heating time in the reaction process (duration of reaction temperature) is preferably within 30 minutes, more preferably within 15 minutes, and further preferably within 2 minutes.

Next, the following explains (ii) concentration of the material. The reaction temperature may be set to an appropriate value according to the type of material, the type of reaction, the shape of reactor, the temperature etc. An excessive high concentration results in an increase in viscosity of solution, causing a great pressure loss in the reactor. On the other hand, an excessive low concentration is not desired either, as it results in a decrease in yield of the product, or a decrease in reaction speed, prolonging the reaction time. In view of this the concentration of the material is preferably set in a range of 0.0001 vol % to 30 vol %, more preferably in a range of 0.01 vol % to 5 vol %.

Further, to carry out uniform coating, it is important to avoid unevenness of concentration of material in the mixing process. The mixing speed needs to be sufficiently quicker than the deposition speed, preferably in a range of 0.00001 seconds to 1 minute. A mixing process of less than 0.00001 seconds is not achieved by the existing technology, and a mixing process of more than a minute does not make much difference from the batch method.

In other words, the control of mixing time is required in the foregoing second case regarding (i) reaction temperature and duration. More specifically, in the second case where the mixing process is carried out after the material is heated to the reaction temperature, the mixing time becomes an important factor, and therefore the concentration of material becomes an issue as much as the reaction temperature and the duration. Therefore, both the reaction conditions (i) and (ii) are concerned in the second case.

The following explains the (iii) time for keeping the fine core particles and the raw material for coating layer inside the micro flow path (retention time). Because of its narrow and long shape, the micro flow path has a distribution in flow rate, which also causes a distribution in time where the fine core particles and the raw material for coating layer are kept inside the micro flow path (retention time). Here, if the particles are synthesized at the interface of the phase of the fine core particle and the phase of the raw material for coating layer, the retention time due to speed distribution is reduced. The ratio between the two phases can be changed to an arbitrary value by changing the flow rate. This method of two-phase synthesis is adopted in consideration of particle size distribution and productivity of the type of particles to be manufactured.

Further, the distribution in retention time due to the distribution in flow rate can be reduced by supplying gas etc. into the flow path so as to segment the reaction solution. It is possible to select a suitable substance for this gas or the like supplied into the flow path, according to the reaction system. For example, an inactive gas such as nitrogen, argon, or helium; an oxide gas such as air, or oxygen; reductic gas such as hydrogen or ammonia may be used.

The substance supplied to the flow path may be a liquid not evenly mixable with the reaction solution. For example, in the case of using a water-soluble reaction solution, a non-polar solvent such as hexan, cyclohexan, or truen may be used. In the case of using an oil-soluble reaction solution, a polar solvent such as water, dimethylsulfoxide, or dimethylformamide may be used.

[Nuclei for Fine Particle Synthesizing Step]

In the method for manufacturing fine composite particle according to the present invention, a nuclei for fine particle synthesis step for synthesizing the nuclei for fine particle from only the first component may be carried out at a former stage of the fine particle composite step. More specifically, in the present invention, the fine core particles may be nuclei for fine particle products, or they may be manufactured through a nuclei for fine particle producing step as a part of series of manufacturing steps.

In the nuclei for fine particle synthesis step, the nuclei for fine particles are synthesized by using only the first component. The way/condition of this step is not particularly limited; however, as with the foregoing fine particle composite step, the method using a micro flow path is also suitable for this process.

More specifically, a solution containing a particle-forming precursor having the first component is continuously supplied into a nuclei for fine particle-forming micro flow path with a control of reaction condition as with the fine particle composite step. As a result, the nuclei for fine particles are synthesized. The resulting nuclei for fine particles are then continuously supplied into the micro flow path as the fine core particles. This nuclei for fine particle manufacturing step may be carried out by the technology disclosed in Kokai (Jpn. unexamined patent publication) No. 2003-225900, which was suggested by the inventors of the present invention, described in detail in the section of "BACKGROUND ART".

Here, the particle-forming precursor is not particularly limited. As explained in the section (1) above, the material is not always required to be raw material but may be a substance tuned into the desired material as a result of reaction. In the present invention, the material supplied to the reactor may be a raw material for coating layer for forming a coating layer, or a particle-forming precursor for synthesizing the nuclei for fine particles. Therefore, the reaction process for synthesizing the nuclei for fine particle is not particularly limited, for example, the reaction process disclosed in Kokai (Jpn. unexamined patent publication) No. 2003-225900 or the reaction process described in the section (1) above may be used. Further, the particle diameter of the nuclei for fine particle is not restricted but preferably within a range of 1 to 100 nm, with which the particle diameter of a resulting fine composite particle falls within the foregoing desirable range.

(4) Manufacturing Apparatus for Fine Composite Particle

The manufacturing apparatus of the present invention for fine composite particles manufactures the foregoing fine composite particles, and preferably carries out the foregoing manufacturing method of the fine composite particle. As shown in FIG. 1, a typical manufacturing apparatus according to the present invention is constituted of at least nuclei for fine particle supplying means (fine core particle supplying means) 11; the second phase base material solution supplying means (raw material for coating layer supplying means) 12; and a composite particle producing reactor (reactor) 13. This manufacturing apparatus preferably further includes a control section (controlling means) 14, and a collecting container (fine composite particle collecting means) 15. Note that, the nuclei for fine particle supplying means (fine core particle supplying means) 11, the second phase base material solution supplying means (raw material for coating layer supplying means) 12, the composite particle producing reactor (reactor) 13 and the collecting container (fine composite particle collecting means) 15 are connected via a pipe 16, allowing the materials and the fine particles to be transported.

[Nuclei for Fine Particle Supply Section]

The nuclei for fine particle supply section 11 continuously supplies a solution containing particle-forming precursor having the first component into a nuclei for fine particle-forming micro flow path 31. The practical structure of the nuclei for fine particle supply section 11 is not particularly limited, but a general pump, particularly a pump with less pulsation, such as a syringe pump or a pulseless pump can be used.

The nuclei for fine particle supply section 11 may serve only to supply the fine core particle, and therefore it may be only capable of supplying the product (synthesized) nuclei for fine particle into the micro flow path 31. However, the nuclei for fine particle supply section 11 is not limited to this structure, and may have a function of synthesizing the nuclei for fine particles to be supplied to the micro flow path 31, as shown in FIG. 2.

In this example, the nuclei for fine particle supply section 11 is constituted of a syringe pump 21 and a nuclei for fine particle synthesizing reactor 22. The nuclei for fine particle synthesizing reactor 22 includes a micro flow path 34 capable of synthesizing nuclei for fine particles. Therefore, the syringe pump 21 serves as a particle-forming precursor supplying means, which continuously supplies a solution containing a particle-forming precursor having the material of nuclei for fine particle (the first component) into the nuclei for fine particle synthesizing reactor 22. As with a nuclei for fine particle synthesizing reactor 13 which will be described later, the nuclei for fine particle synthesizing reactor 22 has a micro flow path 34. The rest of the structure of the nuclei for fine particle synthesizing reactor 22 is also the same as the nuclei for fine particle synthesizing reactor 13, and therefore the minute explanation is omitted here.

Figure 2:
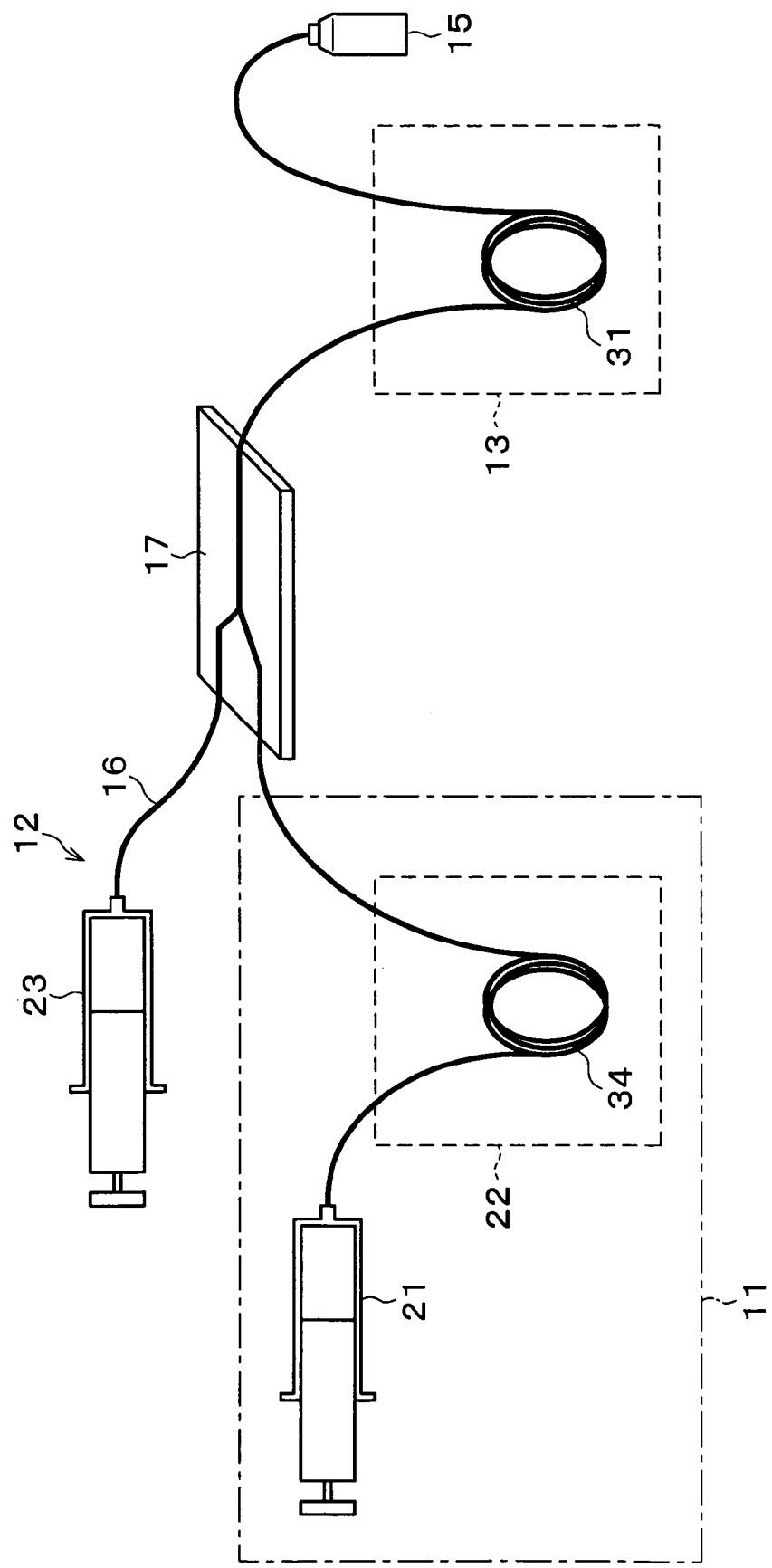
FIG. 2 is a schematic view of manufacturing apparatus shown in FIG. 1, which is used in an Example of the present invention.
Figure 3:
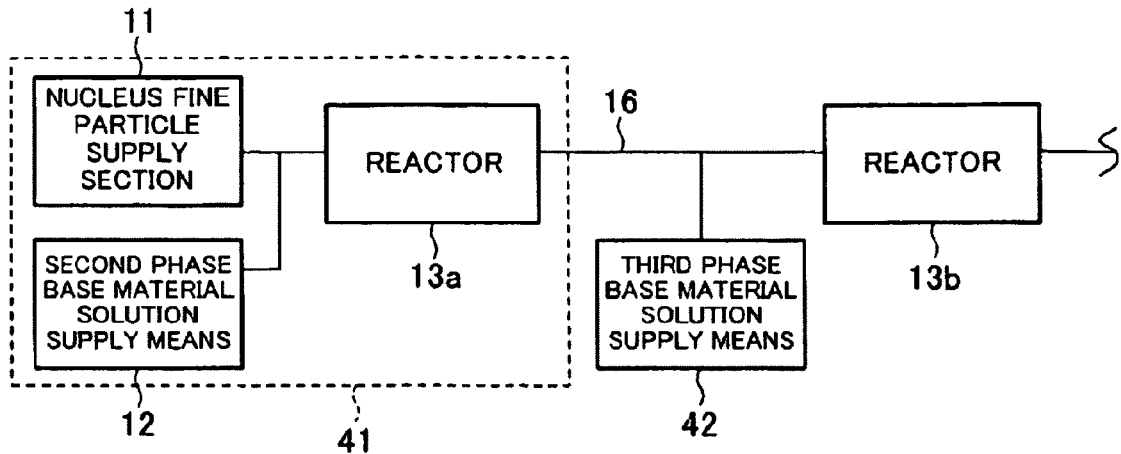
FIG. 3 is a block diagram of another example of manufacturing apparatus shown in FIG. 1.

In the example shown in FIGS. 1 and 2, the nuclei for fine particle supply section 11 serves as the nuclei for fine particle supplying means; however, the present invention is not limited to this structure. For example, as shown in FIG. 3, it is possible to use a raw material for coating layer supplying means 41 for supplying fine composite particles as the fine core particle. The fine composite particle supply section 41 is constituted of the nuclei for fine particle supply section 11, the second phase base material solution supply section 12 and a composite particle producing reactor 13a, and is connected to a third phase base material solution supply section 42 and a composite reactor 13b via a pipe 16. However, this is only an example, and other structure may be used, such as a structure to simply supply product (synthesized) fine composite particle (for example syringe pump 21 shown in FIG. 2).

In the manufacturing apparatus according to the present invention includes fine core particles supplying means which is capable of continuously supplying a fine particle dispersion solution, in which the fine core particles 1-1000 nm in particle diameter are dispersed in a solvent, into the micro flow path 31. The other structure is not particularly limited.

[The Second Phase Base Material Solution Supply Section]

The second phase base material solution supply section 12 continuously supplies the raw material for coating layer in the form of a solution into the micro flow path 31 so as to coat the nuclei for fine particle made of the first component with a layer of the second component. The other structure of the second phase base material solution supply section 12 is not particularly limited, and may be realized by a general pump or the like, as with the nuclei for fine particle supply section 11. Particularly, a pump with less pulsation is more preferable, such as a syringe pump 23 shown in FIG. 2, or a pulseless pump.

The manufacturing apparatus of the present invention may include another raw material for coating layer supplying means, in addition to the second phase base material solution supply section 12. For example, in the case of having the fine composite particle supply section 41 including the nuclei for fine particle supply section 11, the second phase base material solution supply section 12, and the composite particle producing reactor 13a as shown in FIG. 3, a third phase base material solution supply section 42 may be used. In manufacturing such a fine composite particles made of a plurality of components (e.g. n components (n>2)), n−1×raw material for coating layer supplying means are provided.

The operation of the second phase base material solution supply section 12, or the third phase base material solution supply section 42 etc. may be controlled by a control section 14. However, this control is not necessarily required (the control section 14 may be omitted). This control will be described later, with the details of the control section 14.

To ensure uniformity in reaction time and concentration of the material in the micro flow path 31, the base material fine particles and the fine composite particles need to be supplied immediately and evenly, particularly when a solution of the base material is added after the temperature is increased to the reaction temperature. Therefore, as shown in FIG. 2, the manufacturing apparatus may have a mixer 17 in the pipe 16 which resides between the nuclei for fine particle supply section 11 and the second phase base material solution supplying means 12. This mixer 17 may have an arbitrary form. Example materials include a micro mixer capable of small amount of mixing, a mixing tube, a ultrasonic mixer, or the like.

Note that, as detailed in the explanation of "fine particle composite step" of Section (3), the present invention may use a mixture solution prepared by previously mixing the fine core particle dispersion solution and the raw material for coating layer solution. For example, the mixture solution may be supplied from a single syringe pump. More specifically, the fine core particles supplying means and the raw material for coating layer supplying means may be unified as a single supplying means.

Similarly, as detailed in the explanation of "fine particle composite step" of Section (3), two or more kinds of components may be supplied as the raw material for coating layer. In this case, the plural kinds of component may be supplied from the same single second phase base material solution supply section 12, or may be separately supplied from a plurality of second phase base material solution supply sections 12. If they are separately supplied from the plural supply sections, they then may be mixed together by mixing means, such as a mixer 17 or the like, before supplied into the micro flow path 31.

[Reactor]

The composite reactor 13 has a diameter in a range of 1 μm to 1 mm, and includes the micro flow path 31 specified to 1-4000 in Reynolds number. In this case, as described in the Section (1) above, the diameter of the micro flow path 31 (micro flow path 34) is preferably in a range of 1-5000 μm. The detailed structure of the micro flow path 31 (micro flow path 34) is explained in the Section (1) above, and therefore the explanation is omitted here.

The structure of the composite reactor 13 is not particularly limited. For example, the structure disclosed in Kokai (Jpn. unexamined patent publication) No. 2003-225900 may be adopted. It however should be noted that, as shown in FIG. 1, this embodiment of the present invention has a structure using at least one of a heating section (heating means) 32 and a cooling section (cooling means) 33. Like the second phase base material solution supply section 12, the heating section 32 and the cooling section 33 are preferably controlled by the control section 14.

The micro flow path 31 carries out composite reaction inside the tube. Here, the evenness of reaction time or reaction temperature is necessary to produce fine composite particles superior in quality. Therefore, in the composite reactor 13, the mixture to be reacted (mixture of the raw material for coating layer and the fine core particles) needs to be heated as immediately and evenly as possible. Therefore, it is preferable to use the heating section 32, which is preferably controlled by the control section 14.

The structure of the heating section 32 is not particularly limited, and may be realized by a general heating apparatus. For example, oil-bus, heating block, electric furnace, infrared heating apparatus, laser beam, xenon lamp, and general heating apparatus are suitable.

Further, the heat may be naturally discharged after the heating by the heating section 32 (the cooling section 33 is omitted). However, with the provision of the cooling section 33, which is preferably controlled by the control section 14, the evenness of reaction time and reaction temperature is further ensured. The structure of the cooling section 33 is not particularly limited, and may be realized by a general cooling apparatus. For example, air-cooling apparatus, water-cooling apparatus, oil-cooling apparatus, or other general cooling apparatuses are suitable.

Further, the heating section 32/cooling section 33 may be capable of partially heating/cooling inside the micro flow path 31. More specifically, the heating section 32/cooling section 33 may be small heat generating elements or Peltier elements, which are provided around the flow path, or a member for externally irradiating the flow path with an electromagnetic wave.

Note that, the nuclei for fine particle synthesizing reactor 22 includes the micro flow path 34 capable of synthesizing fine core particles. For example, the structure disclosed in Kokai (Jpn. unexamined patent publication) No. 2003-225900 may be adopted. The basic structure of the nuclei for fine particle synthesizing reactor 22 is the same as that of the composite reactor 13.

As with the foregoing raw material for coating layer supplying means (the n-th phase base material solution supplying means), the composite reactor 13 may be constituted of a plurality of composite reactors according to how many components are desired in the complete fine composite particles. For example, in the example shown in FIG. 3, as described above, the three kinds of components: the nuclei for fine particle (the first component), the second phase base material solution (the second component), and the third phase base material solution (the third component) are supplied. In this case, the composite reactors 13a and 13b are provided for each stage of coating.

Figure 4:
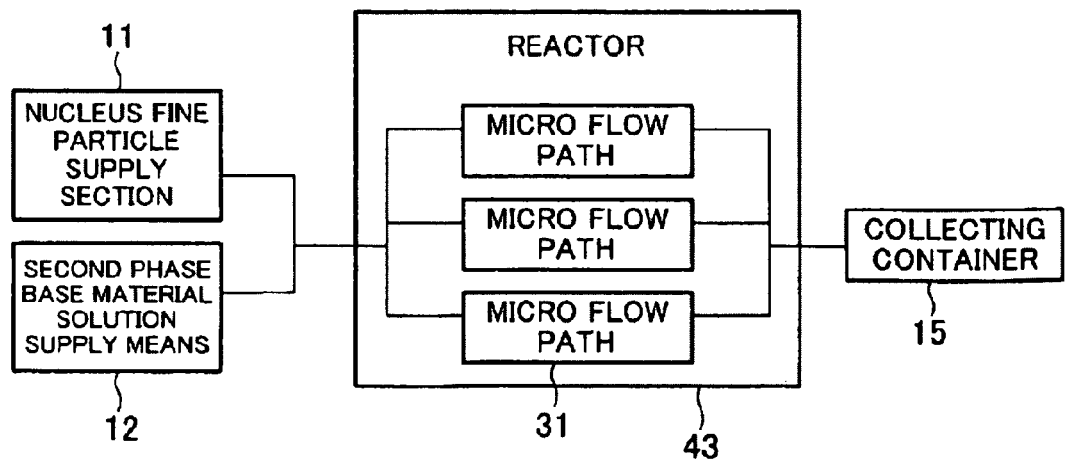
FIG. 4 is a block diagram of still another example of manufacturing apparatus shown in FIG. 1.

Further, as shown in FIG. 4, a composite reactor 43 in which a plurality of micro flow paths are aligned in parallel may be used for mass manufacturing of fine composite particles. The composite reactor 43 allows simultaneous enforcement of a plurality of particle composite processes, thereby increasing productivity of fine composite particles per unit time. The mass production of fine composite particles thus becomes possible. This structure does not always use a single nuclei for fine particle supply section 11 and a single n-th phase base material solution supplying means, and their number may be determined according to the desired product. Further, the nuclei for fine particle supply section 11 and the single n-th phase base material solution supplying means may be provided in two different composite reactors 13 which are tied together.

[Control Section]

The manufacturing apparatus according to the present invention at least includes a control section 14 for controlling the operation of the second phase base material solution supply section (raw material for coating layer supplying means). As with the one shown in FIG. 1, the control section 14 preferably has a function of controlling operations of the heating section 32 and the cooling section 33. The structure of the control section 14 is not particularly limited. For example, in the case where the manufacturing apparatus according to the present invention is contained in a single casing, an existing micro processor may be used. In the case where the manufacturing apparatus is realized as a manufacturing system constituted of various kinds of apparatus, the control section 14 may be realized by a suitable program installed to a personal computer. Further, the collecting container (collecting means; described later) may be given a function of measuring the characteristic of the resulting product (fine composite particle), the result is then fed back to the control section 14.

As detailed in the explanation of "fine particle composite step" of Section (3), the present invention achieves accurate control of reaction condition in the fine particle composite step. The condition factors to be controlled are at least one of (i) reaction temperature and duration of the temperature, (ii) concentrations of the fine core particles and the raw material for coating layer, and (iii) a time for keeping the fine core particles and the raw material for coating layer inside the micro flow path.

The control of (i) reaction temperature and duration of the temperature may be performed by controlling the operation of the heating section 32 or the operation of the cooling section 33. Further, the controls of (ii) concentrations of the fine core particles and the raw material for coating layer and (iii) a time for keeping the fine core particles and the raw material for coating layer inside the micro flow path may be performed by controlling the operation of the second phase base material solution supply section (raw material for coating layer supplying means). The way/condition of this control method is not particularly limited, and any conventional techniques allowing controls of the respective means with appropriate timing/operation level may be used.

Further, in the case of the manufacturing apparatus of FIG. 3 including a plurality of raw material for coating layer supplying means, the control means 14 (not shown in FIG. 3) controls the operation of each of the raw material for coating layer supplying means (the second phase base material solution supply section 12 and the third phase base material solution supply section 42) so that the respective components are successively supplied from the plurality of raw material for coating layer supplying means.

[Collecting Container/Tube]

The manufacturing apparatus according to the present invention preferably includes a collecting container (collecting means) 15 for collecting fine composite particle. The collecting container 15 needs to have a function of appropriately collecting the produced fine composite particles, and its structure is not particularly limited. In the case of the present embodiment, one example of collecting container may be a container (preferably capable of atmosphere adjustment) made of a material resistant to the reaction solution.

The nuclei for fine particle supply section 11, the second phase base material solution supply section 12, the composite reactor 13, the collecting container 15 are connected through the tube 16, allowing the material and the fine particles to be transported. The tube 16 has a structure letting the fine composite particles to be smoothly transported, but otherwise the structure of the tube 16 is not particularly limited. For example, in the present embodiment, the capillary tube serving as the micro flow path 31 may be used as the tube 16.

(5) EXAMPLES

The following minutely describes one example of the present invention. The present invention is however not limited to this example.

Example 1

First Example of ZnS Coated CdSe Fine Particle Synthesizing Process

A solution (first solution containing a particle-forming precursor) prepared by adding 165 μl of octyl amine and 26.6 mg of cadmium acetate to 5 ml of octadecene was mixed by a ratio of 1:1 with another solution in which 494 μl of serene is dissolved in 25 ml of trioctyl phosphine (TPO). The mixture was supplied to a syringe pump until it filled up the pump, and then was poured into a capillary (a micro flow path of material-synthesizing reactor), which was heated to 275° C., so that it runs through the tube. Produced was a CdSe fine particle solution (average particle diameter=3 nm), which serves as nuclei for fine particle.

A solution (raw material for coating layer solution, second phase base material solution) in which [(CH3)2NCSS]2Zn is dissolved in TPO was supplied to a syringe pump until it filled up the pump, and was mixed with the CdSe fine particle solution (fine core particle dispersion liquid) by a mixer by a ratio of 1:1 (50 vol %: 50 vol %). The mixture solution then was poured into a capillary of 0.2 mm in internal diameter (micro flow path of a material-synthesizing reactor), which was heated to 180° C., so that it runs through the tube. The resulting ZnS coated fine particles (fine composite particle) were collected into a collecting container.

The heating time was varied by changing the flow rate, so that plural kinds of fine composite particle samples were obtained. Table 1 shows UV peak point, half bandwidth, quantum yield with respect to the heating time in the fine composite particle samples.

TABLE 1

| HEATING TIME (SECOND) | UV PEAK POINT (nm) | HALF BAND-WIDTH (nm) | QUANTUM YIELD (%) |
|---|---|---|---|
| 0 | 502 | 37.7 | 13 |
| 3.5 | 502 | 36.2 | 28 |
| 7 | 503 | 36 | 36 |
| 14 | 507 | 35.1 | 65 |
| 28 | 512 | 35.9 | 70 |
| 70 | 520 | 38.1 | 51 |

In the ZnS coated CdSe fine particles, it is known that a change in heating time on the second time scale after the ZnS coating causes an increase in intensity of fluorescent peak, making it shift to the long wavelength side, while keeping the same half bandwidth. The shifting amount depends on the thickness of the ZnS coating layer (see Document I: Xiaogana Peng et al., J. Am. Chem. Soc., 1997, 119, 7019-7029). On the other hand, the half bandwidth of the fluorescent spectrum is constantly kept at 35 nm. Assuming that the distribution of coating amount causes enlargement of the half bandwidth of the fluorescent spectrum, this result indicates that the coating amount is not enlarged in this example.

As shown in Table 1, in the ZnS coated CdSe fine particle obtained in the present example, the quantum yield of the sample having the highest fluorescence is 70% and the half bandwidth of the fluorescent spectrum at that point was 35 nm. For this particle diameter, the reaction condition is generally required to be accurately controlled in order to avoid variation in shifting of peak point; however, the manufacturing method and the manufacturing apparatus enable successive production of high-quality fine composite particles.

Example 2

Second Example of ZnS Coated CdSe Fine Particle Synthesizing Process

ZnS coated CdSe fine particles were manufactured by a fine composite particle manufacturing apparatus having the structure shown in FIG. 2.

A CdSe fine particle base solution (a solution containing a particle-forming precursor) in which 20 g of stearic acid, trioctyl phosphine oxide and trioctyl phosphine; 266 mg of cadmium acetate, and 494 mg of serene are dissolved was prepared, and the solution was supplied to a syringe pump 21 shown in FIG. 2 until it filled up the pump. Meanwhile, a ZnS coating base solution (composite base solution, or the second phase base material solution) was prepared by mixing 0.4 mmol of dimethyl cadmium and 0.51 mmol of bistrimethylsilyl sulfide with 3 g of TOP, and this solution was supplied to a syringe pump 23 until it filled up the pump.

The CdSe fine particle base solution was pumped into a capillary (micro flow path 34 of a material-synthesizing reactor 22) from the syringe pump 21, and fine particles were synthesized in the material-synthesizing reactor 22 heated to 300° C. The resulting particles were then mixed with the coating base solution, which was pumped from the syringe pump 23, by the mixer 17 under condition=0.1 ml/min, are were reacted in a material-synthesizing reactor 13 heated to 240° C. so as to form a ZnS layer.

As a result, ZnS coated CdSe fine particles were synthesized with a quantum yield of 70%, in which the maximum fluorescent wavelength is 550 nm (particle diameter 3.5 nm), and the fluorescent half bandwidth is 38 nm.

Example 3

Third Example of ZnS Coated CdSe Fine Particle Synthesizing Process

First, ZnS coated CdSe fine particles were produced by heating a base solution and then immediately subjecting it to mixing by a micro mixer.

In the same manner as that of Example 2, a CdSe fine particle solution was prepared, and 0.4 mmol of dimethyl cadmium was dissolved therein. The resulting solution was supplied into a syringe pump until it filled up the pump. Meanwhile, a coating base solution (composite base solution, or the second phase base material solution) was prepared by mixing 0.51 mmol of bistrimethylsilylsulfide with 3 g of TOP, and this solution was supplied to a syringe pump 23 until it filled up the pump. Then, the two kinds of solutions were supplied into a micro flow path to run through it so that they were heated to 240° C., and were mixed together by a micro mixer (the mixing is completed in 0.05 seconds). After that, the solutions were supplied into a micro flow path again to run through it so that they were kept heated for 7 minutes, and then were supplied into a micro flow path at room temperature to run through it so that they were cooled down.

As a result, ZnS coated CdSe fine particles are synthesized with a quantum yield of 65%, in which the maximum fluorescent wavelength is 545 nm (particle diameter 3.4 nm), and the fluorescent half bandwidth is 37 nm.

Example 4

Example of Maghemite Coated Platin um Fine Particle Synthesizing Process

A solution prepared by dissolving 2 g of 1,2-hexadecanol, 0.4 mL of oleic acid and 0.4 mL of oleylamine in 15 mL of octylether was heated to 290° C. Another solution was prepared by dissolving 1 g of platinum acetylacetnate in 10 mL of octylether, and was heated. The two solutions were mixed together by a micro mixer, producing a platinum colloid (nuclei for fine particle) solution.

The solution was cooled down to room temperature, and 0.1 g of iron pentacarbonyl was added thereto. The mixture was poured into a capillary of 0.2 mm in internal diameter (micro flow path of a material-synthesizing reactor), which was heated to 300° C., so that it runs through the tube. The resulting maghemite coated platinum fine particles (fine composite particle) were collected into a collecting container.

The heating time was varied by changing the flow rate, so that plural kinds of fine composite particle samples were obtained. Table 2 shows the average diameter and the heating time with respect to each sample produced. This result indicates that the present invention allows control of particle diameter, more specifically, control of coating thickness.

TABLE 2

| HEATING TIME (SECOND) | AVERAGE PARTICLE DIAMETER (nm) |
|---|---|
| 10 | 11 |
| 30 | 14 |
| 100 | 16 |
| 300 | 18 |

Example 5

Example of Silver Coated Gold Fine Particle Synthesizing Process

Gold fine particles (nuclei for fine particle) were prepared by boiling a solution, which was prepared by adding citric acid to an aurichloride acid aqueous solution, to 100° C. In the gold fine particles, the average particle diameter was 15 nm, and the coefficient of variation was 5%. After deoxidization, the gold particles were mixed with a citric acid methanol solution, producing a gold particle dispersion solution (fine core particle dispersion solution). Meanwhile, a silver potassium cyanide methanol solution (composite base solution, or the second phase base material solution) was prepared. The two solutions were poured from separate points, and then mixed immediately before passing through an oil bath section by an online control. In this apparatus, the mixture liquid is immediately heated as it passes through the heated oil, and then suddenly cooled down by outside air as it comes out of the oil. The heating time was 15 minutes. In the resulting silver coated gold fine particles, the average particle diameter was 20 nm, and the coefficient of variation was 5%.

Example 6

Example of TiO$_2$ Coated Polystyrene Fine Particle Synthesizing Process

The reaction process for forming a layer was carried out in ethanol at room temperature. 0.4 g of polyvinyl pyrrolidone and 1 ml of 5 mM NaCl were dissolved in ethanol to prepare a solution A. 3.1 ml of ethanol in which 100 mg/ml of polystyrene latex were suspended was added to the solution A. Meanwhile, a solution B was prepared by dissolving 0.45 ml of tetraisopropoxytitan in 6 ml of ethanol.

The solution A and the solution B were pumped from the two different syringe pumps at flow rates of 0.4 ml/min and 0.06 ml/ml, respectively, and were mixed by a micro mixer. They were immediately reacted, synthesizing fine composite particles each coated with a 15 nm thick layer.

Example 7

Example of CdSe Coated ZnS Fine Particle Synthesizing Process

CdSe coated ZnS fine composite particles were produced by a fine composite particle manufacturing apparatus having the structure shown in FIG. 1.

First, a ZnS fine particle base solution (particle-forming precursor solution) was prepared by mixing 2.8 mmol of dimethyl cadmium and 11.2 mmol of bistrimethylsilylsulfide with 12 g of TOP, producing ZnS nuclei for fine particles in the same method as that of Example 2.

Next, a CdSe coating base solution (the second phase base solution) was prepared by dissolving 6.0 g of stearic acid, trioctyl phosphine oxide and trioctyl phosphine; 26.6 mg of cadmium acetate, and 49.4 mg of serene. The solution was supplied to the second phase base material solution supply section 12 constituted of a syringe pump until it filled up the pump.

The ZnS fine particles and the CdSe coating base solution were pumped from the nuclei for fine particle supply section 11, and the second phase base material solution supply section 12, respectively. The mixture was then heated in the reactor 13 heated to 270° C. for 30 seconds, forming a CdSe layer.

As a result, ZnS coated CdSe fine particles are synthesized with a quantum yield of 10%, in which the maximum fluorescent wavelength is 488 nm (particle diameter 4.0 nm), and the fluorescent half bandwidth is 50 nm.

Example 8

Example of ZnS/CdSe/ZnS Fine Particle Synthesizing Process

ZnS/CdSe/ZnS fine particles were produced by a fine composite particle manufacturing apparatus having the structure shown in FIG. 3 (this apparatus includes a collecting container at a later stage of the reactor 13b).

The CdSe coated fine particles were produced in the same method as that of Example 7. Then the CdSe coated ZnS fine particles and a ZnS coating base solution (the third phase base solution), identical in composition to the ZnS fine particle base solution, were pumped from the reactor 13b, respectively. The mixture was then heated in the reactor 13b heated to 240° C. for 150 seconds, forming a ZnS layer.

As a result, ZnS/CdSe/ZnS fine particles are synthesized with a quantum yield of 50%, in which the maximum fluorescent wavelength is 486 nm (particle diameter 6.2 nm), and the fluorescent half bandwidth is 50 nm.

Figure 6:
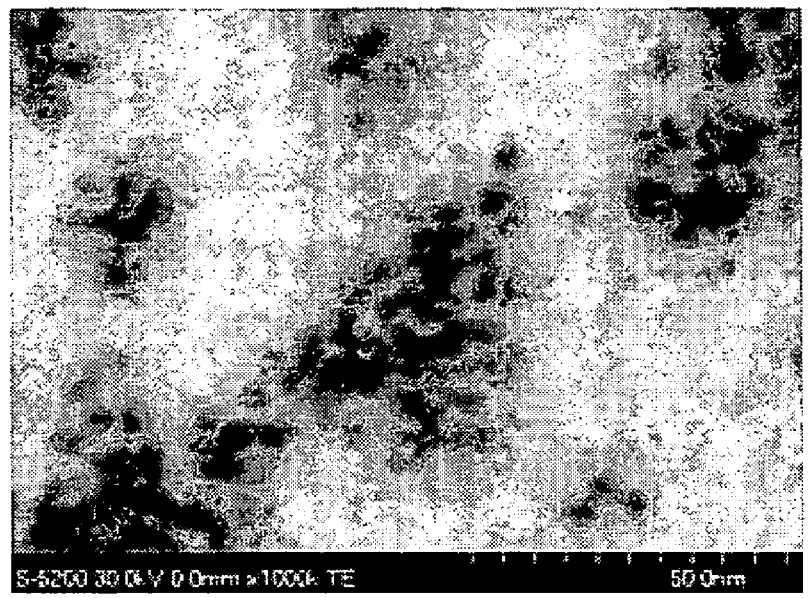
FIG. 6(a) is a picture showing an observation result of ZnS/CdSe/ZnS fine particles obtained by Eighth Example of the present invention by using a transmitting electron microscope (TEM).
FIG. 6(b) is a partial magnified view of FIG. 6(a).
Figure 6:
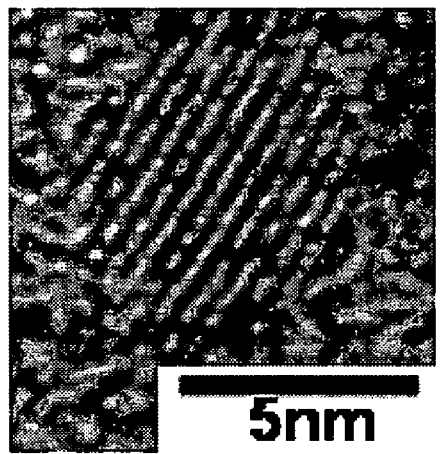

The resulting ZnS/CdSe/ZnS fine particles were observed by a transmissive electronic microscope (TEM). As shown in FIGS. 6(a) and 6(b), the particle diameter was about 6 nm.

Figure 7:
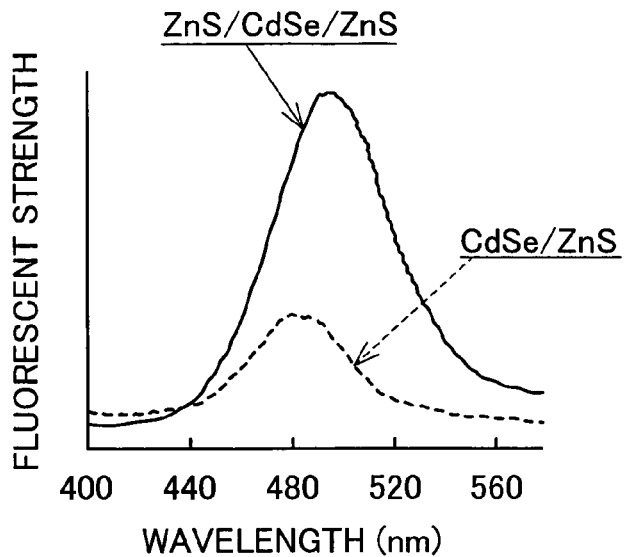
FIG. 7 is a drawing showing respective fluorescent spectrums of CdSe coated ZnS fine particles (CdSe/ZnS nano particles) obtained by Seventh Example, and of the ZnS/CdSe/ZnS fine particles obtained by Eighth Example.

Further, as shown in FIG. 7, the CdSe coated ZnS fine particle produced in Example 7 and the ZnS/CdSe/ZnS fine particles produced in this Example were compared with each other. It was found that the ZnS/CdSe/ZnS fine particles had more intensive fluorescent strength.

With this structure in which a CdSe layer is sandwiched between ZnS layers (ZnS/CdSe/ZnS structure), it is possible to produce fine particles containing CdSe as a light emitting section (CdSe-type fine particle), in which light is emitted from the CdSe layer is approximately 1 nm thick.

Example 9

Second Example of ZnS/CdSe/ZnS Fine Particle Synthesizing Process

The same method as that of Example 8 was carried out, but the 270° C. heating process for forming CdSe layer was performed with three different durations: 30 seconds, 45 seconds and 60 seconds. As a result, plural kinds of ZnS/CdSe/ZnS fine particle sample are obtained with CdSe layers of different thicknesses. Note that, in forming the ZnS layer, the heating was carried out in the same way as that of Example 8: at 240° C. for 150 seconds.

Figure 8:
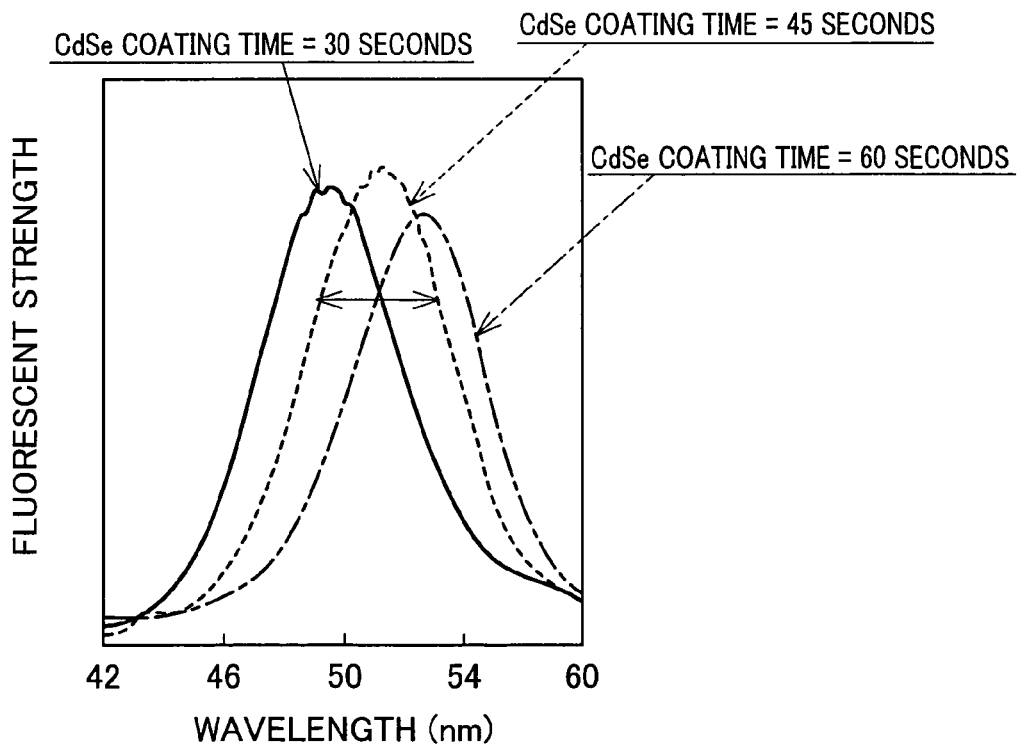
FIG. 8 is a drawing showing a change in fluorescent spectrum of modified ZnS/CdSe/ZnS fine particles obtained by Ninth Example, in which the thickness of CdSe layer is changed.

FIG. 8 shows a fluorescent spectrum, showing the fluorescent wavelength and the fluorescent strength with respect to the heating time. As shown therein, a sample having a thicker CdSe layer emits fluorescent of longer wavelength. This indicates that a sample having a thicker CdSe layer is smaller in bandgap energy.

As described above, in the ZnS/CdSe/ZnS-type fine particles, fluorescent wavelength can be controlled by changing the thickness of CdSe layer.

Note that, in the ZnS/CdSe/ZnS-type fine particles, the electrons and holes of CdSe layer slightly spread into the ZnS layer. According to this, bandgap control of the material having a large bandgap (ZnS, in this example) is likely to change the degree of alleviation of quantum size effect due to the spread of electrons, and changes the fluorescent wavelength.

Example 10

Third Example of ZnS/CdSe/ZnS Fine Particle Synthesizing Process

Figure 9:
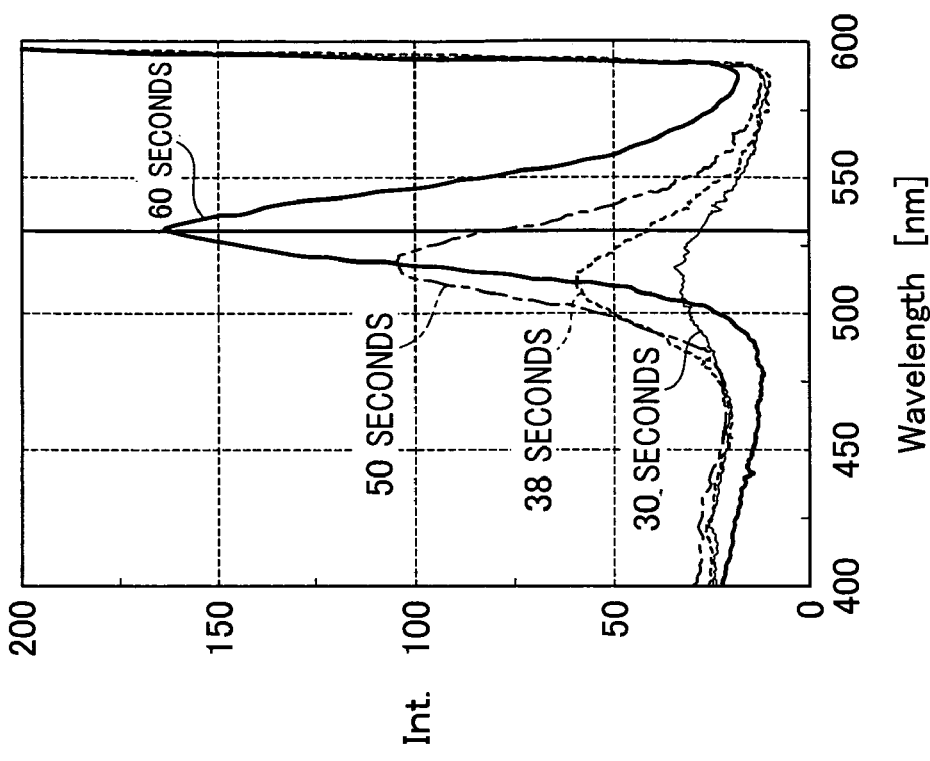
FIG. 9(a) is a drawing showing a change in fluorescent spectrum of another modified ZnS/CdSe/ZnS fine particles obtained by Tenth Example, in which the thickness of CdSe layer is changed.
FIG. 9(b) is a drawing showing a change in fluorescent spectrum of still another modified ZnS/CdSe/ZnS fine particles obtained by Tenth Example, in which the diameter of CdSe layer is changed.
Figure 9:
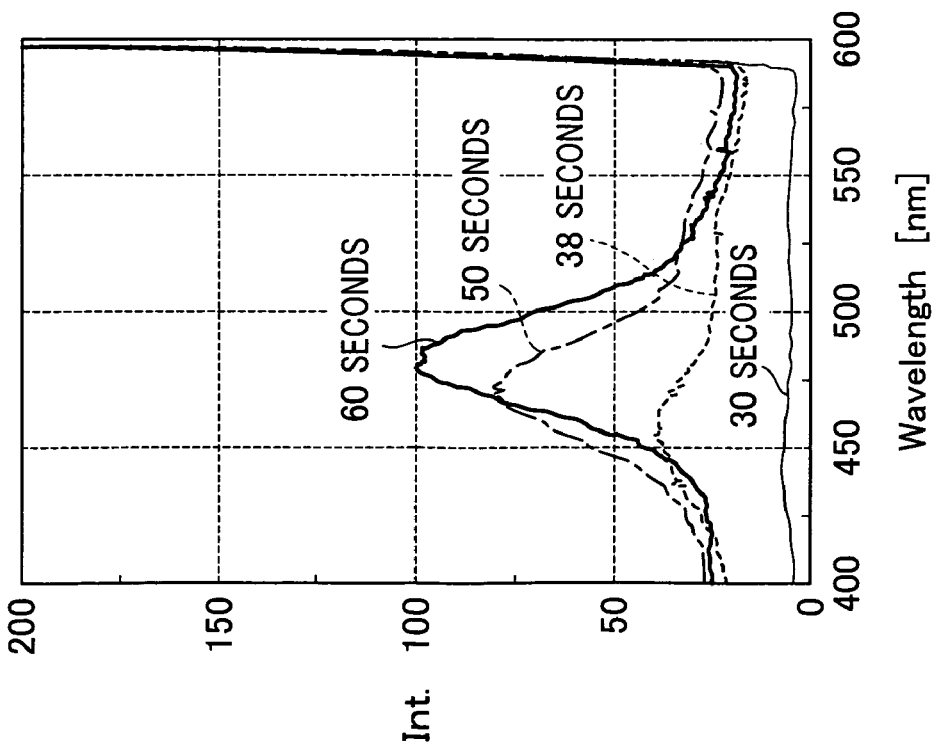

The same method as that of Example 8 was carried out, but the same change in duration in Example 9 was made to confirm how the time for forming the second layer affects the fluorescent wavelength. More specifically, the 180° C. heating process was performed with three different durations: 30 seconds, 38 seconds, 50 seconds and 60 seconds, respectively in the case of forming a CdSe layer on a nucleus ZnS fine particle, and in the case of forming CdSe fine particle without a nucleus particle. FIGS. 9(a) and 9(b) show fluorescent spectrums in these cases.

As shown in FIG. 9(b), when the CdSe fine particles are formed without nucleus particles, a longer heating time makes a thicker layer (in this example, it corresponds to particle diameter of the CdSe fine particle), exhibiting an intensive fluorescent to the longer wavelength side. This is the same as the sample of Example 9.

Meanwhile, as shown in FIG. 9(a), in the CdSe fine particles formed on nucleus particles, a longer heating time also makes a thicker layer, exhibiting an intensive fluorescent to the longer wavelength side as with the case above; however, the fluorescent peak is moved to the shorter wavelength side, exhibiting a blue fluorescent (fluorescent wavelength<480 nm) with a high quantum yield.

In conventional arts, the crystallization property decreases when the particle diameter of the CdSe fine particle falls to 2 nm or less. Therefore, it has been difficult to produce CdSe particles emitting a blue fluorescent. However, the present invention achieves improvement of crystallization property with the use of ZnS/CdSe/ZnS structure, and thereby provides new CdSe fine particles emitting a blue fluorescent.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

As explained above, the present invention accomplished efficient production of high-quality fine composite particles. With this effect, the present invention is useful for various nano technology industries for manufacturing/using nano particles, for example, various industries relating to materials/chemicals for manufacturing nano particles, various electronic parts/electronic apparatuses production industries in which the nano particles are used for production of tunable light emitting diode, single particle transistors, super high density magnetic storage media etc.

The invention claimed is:

1. Fine composite particles of which maximum particle diameter is 1000 nm or smaller, each of the fine composite particles comprising:
   a sandwich structure in which a layer of semiconductor material having a small bandgap is sandwiched between two layers of semiconductor material having a large bandgap, the semiconductor material having a small bandgap and the semiconductor material having a large bandgap being made of different kinds of II-VI compound semiconductor.

2. The fine composite particles as set forth in claim 1, wherein:
   the semiconductor material having a large bandgap is ZnS, and the semiconductor material having a small bandgap is CdSe.

3. The fine composite particles as set forth in claim 1, wherein:
   the maximum particle diameter of the fine composite particles is 20 nm or smaller.

4. The fine composite particles as set forth in claim 1, wherein:
   the layer of semiconductor material having a small bandgap has a thickness of 2 nm or smaller.

* * * * *

UNITED STATES PATENT AND TRADEMARK OFFICE
CERTIFICATE OF CORRECTION

PATENT NO. : 8,017,235 B2  
APPLICATION NO. : 10/570384  
DATED : September 13, 2011  
INVENTOR(S) : Nakamura et al.

Page 1 of 1

It is certified that error appears in the above-identified patent and that said Letters Patent is hereby corrected as shown below:

Title page, Item (75) should read:

(75) Inventors: Hiroyuki Nakamura, Tosu (JP); Masato Uehara, Tosu (JP); Hongzhi Wang, Tosu (JP); Hideaki Maeda, Tosu (JP); Masaya Miyazaki, Tosu (JP); Yoshiko Yamaguchi, Tosu (JP); Kenichi Yamashita, Tosu (JP); Hazime Shimizu, Tosu (JP); Xianying Li, Tosu (JP)

Signed and Sealed this  
Seventeenth Day of January, 2012

David J. Kappos  
*Director of the United States Patent and Trademark Office*

UNITED STATES PATENT AND TRADEMARK OFFICE
Certificate

Patent No. 8,017,235 B2                                                      Patented: September 13, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hiroyuki Nakamura, Tosu (JP); Masato Uehara, Tosu (JP); Hideaki Maeda, Tosu (JP); Masaya Miyazaki, Tosu (JP); Yoshiko Yamaguchi, Tosu (JP); Kenichi Yamashita, Tosu (JP); and Hazime Shimizu, Tosu (JP).

Signed and Sealed this Twenty-sixth Day of August 2014.

GWENDOLYN BLACKWELL
*Supervisory Patent Examiner*
Art Unit 1782
Technology Center 1700